US008668076B2

United States Patent
Pasqualoni et al.

(10) Patent No.: US 8,668,076 B2
(45) Date of Patent: Mar. 11, 2014

(54) CONVEYOR DEVICE FOR LASER TREATMENTS

(75) Inventors: Paolo Pasqualoni, Sambuceto di San Giovanni Teatino (IT); Serafino Lupinetti, Elice (IT)

(73) Assignee: Fameccanica.Data S.p.A., Sambuceto di San Giovanni Teatino (Chieti) (IT)

( * ) Notice: Subject to any disclaimer, the term of this patent is extended or adjusted under 35 U.S.C. 154(b) by 14 days.

(21) Appl. No.: 13/322,817

(22) PCT Filed: Apr. 15, 2010

(86) PCT No.: PCT/IB2010/051644
§ 371 (c)(1),
(2), (4) Date: Nov. 28, 2011

(87) PCT Pub. No.: WO2010/140067
PCT Pub. Date: Dec. 9, 2010

(65) Prior Publication Data
US 2012/0067699 A1    Mar. 22, 2012

(30) Foreign Application Priority Data
Jun. 3, 2009 (EP) .................................... 09425222

(51) Int. Cl.
*B65G 45/22* (2006.01)
(52) U.S. Cl.
USPC ........................................ 198/495; 198/494
(58) Field of Classification Search
USPC ........................................ 198/495, 496, 494
See application file for complete search history.

(56) References Cited

U.S. PATENT DOCUMENTS

| 2,346,500 | A | * | 4/1944 | Moore | 134/25.1 |
| 3,471,603 | A | * | 10/1969 | Patrick et al. | 264/118 |
| 3,819,032 | A | * | 6/1974 | Preuss et al. | 198/495 |
| 4,788,732 | A | * | 12/1988 | Kollmar | 8/158 |
| 5,613,594 | A | * | 3/1997 | Kootsouradis | 198/495 |
| 5,649,616 | A |   | 7/1997 | Stecklow | |
| 7,044,287 | B1 | * | 5/2006 | Gray | 198/495 |
| 2003/0146174 | A1 | * | 8/2003 | Hansen et al. | 210/770 |
| 2008/0006514 | A1 | * | 1/2008 | Ostman | 198/823 |

FOREIGN PATENT DOCUMENTS

| EP | 1 447 068 A1 | 8/2004 |
| EP | 1 736 272 A1 | 12/2006 |
| FR | 2 674 457 A1 | 10/1992 |
| GB | 900060 A | 7/1962 |
| WO | WO 2008/081239 A2 | 7/2008 |

OTHER PUBLICATIONS

Abstract for FR 2 674 457 A1 (1 page).
Jul. 20, 2010 PCT Search Report for International Application No. PCT/IB2010/051502 (4 pages).

* cited by examiner

*Primary Examiner* — Gene Crawford
*Assistant Examiner* — Keith R Campbell
(74) *Attorney, Agent, or Firm* — Popovich, Wiles & O'Connell, P.A.

(57) ABSTRACT

A conveyor device (10) for conveying a material (M) through a treatment station (101) where the material (M) is subjected to a laser treatment (12) capable of leaving contamination residues on the conveyor (10). The conveyor (10) outlines a closed loop trajectory passing through, after removing the treated material (M), two brushing stations (103, 106) where the surface of the conveyor (10) is subjected to brushing with a washing station (104) interposed where the conveyor (10) is subjected to washing through the projection (1040, W) of washing liquid.

12 Claims, 3 Drawing Sheets

CONVEYOR DEVICE FOR LASER TREATMENTS

FIELD OF THE INVENTION

Figure 1:
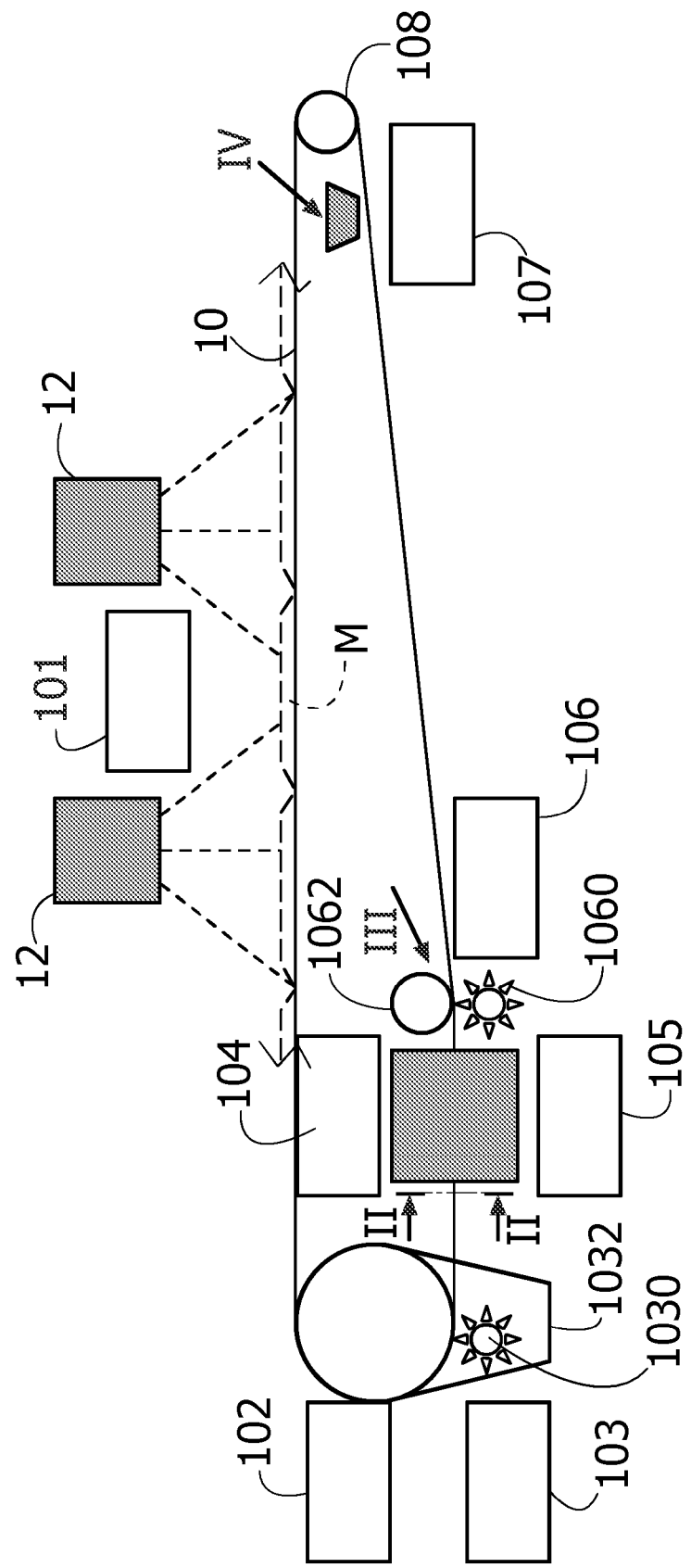

The present description refers to the field of treatment methods (for example cutting and/or welding) implemented through a laser beam.

The description was conceived with particular attention to its possible application to the field of manufacturing sanitary articles (diapers, sanitary pads and the like).

DESCRIPTION OF THE RELATED ART

Documents such as EP-A-1 447 068 and EP-A-1 736 272, both assigned to the instant Assignee, describe solutions for laser treating materials such as raw materials, components and sanitary articles in general.

Documents such as WO-A-2008/081239, also assigned to the instant Assignee, highlight the role played by the support that holds the material subjected to treatment in such methods.

OBJECT AND SUMMARY OF THE INVENTION

The aforementioned solutions described in the documents of the Applicant in question led to achieving entirely satisfactory results.

However, due to reasons linked to the type of materials treated, dust and molten material contamination phenomena involving the support structure and the conveyor system as well as the material treated, may occur in some application contexts. In particular, phenomena regarding deposit of treatment residues in the open regions may occur when structures provided with openings are used for conveying and supporting the material. Phenomena regarding the deposit of treatment residues also in the interstices made between the weft and warp may occur when using a mesh structure.

The inventors perceived the importance of ensuring that the removal of such contaminating material, capable of clogging the openings, causing both the loss of the action of holding the treated material in position, and a possible contamination of the final product, with the possible risk that the product in question remains fixed/stuck against the support on which it is located.

Thus the inventors observed that there is further room for improving the solutions described previously, for example regarding the conveyor structure intended to hold the treated material after and above all during the performance of the laser treatment. This, largely regardless of the fact that such material be in form of raw material (for example a film), a component or an actual article.

The object of the present invention is to provide a solution improved from such point of view.

According to the present invention, such object is attained due to a device having the characteristics specifically referred to in the claims that follow.

The claims form an integral part of the technical disclosure provided herein in relation to the invention.

In an embodiment, the device (equipment) described herein allows eliminating the problem of contamination mentioned previously by operating in a continuous manner during the normal operation step of the laser treatment system, thus avoiding machine stop problems and/or or the need to remove elements forming the machine itself to clean them using external systems.

In an embodiment, a dynamic cleaning unit integrated in the cutting system (carrier) is proposed.

In an embodiment, a washing system is provided for using high-pressure water with a pair of rotary brushes for the mechanical removal of molten residues deposited on the structure for conveying the material subjected to cutting.

BRIEF DESCRIPTION OF THE ATTACHED REPRESENTATIONS

Figure 2:
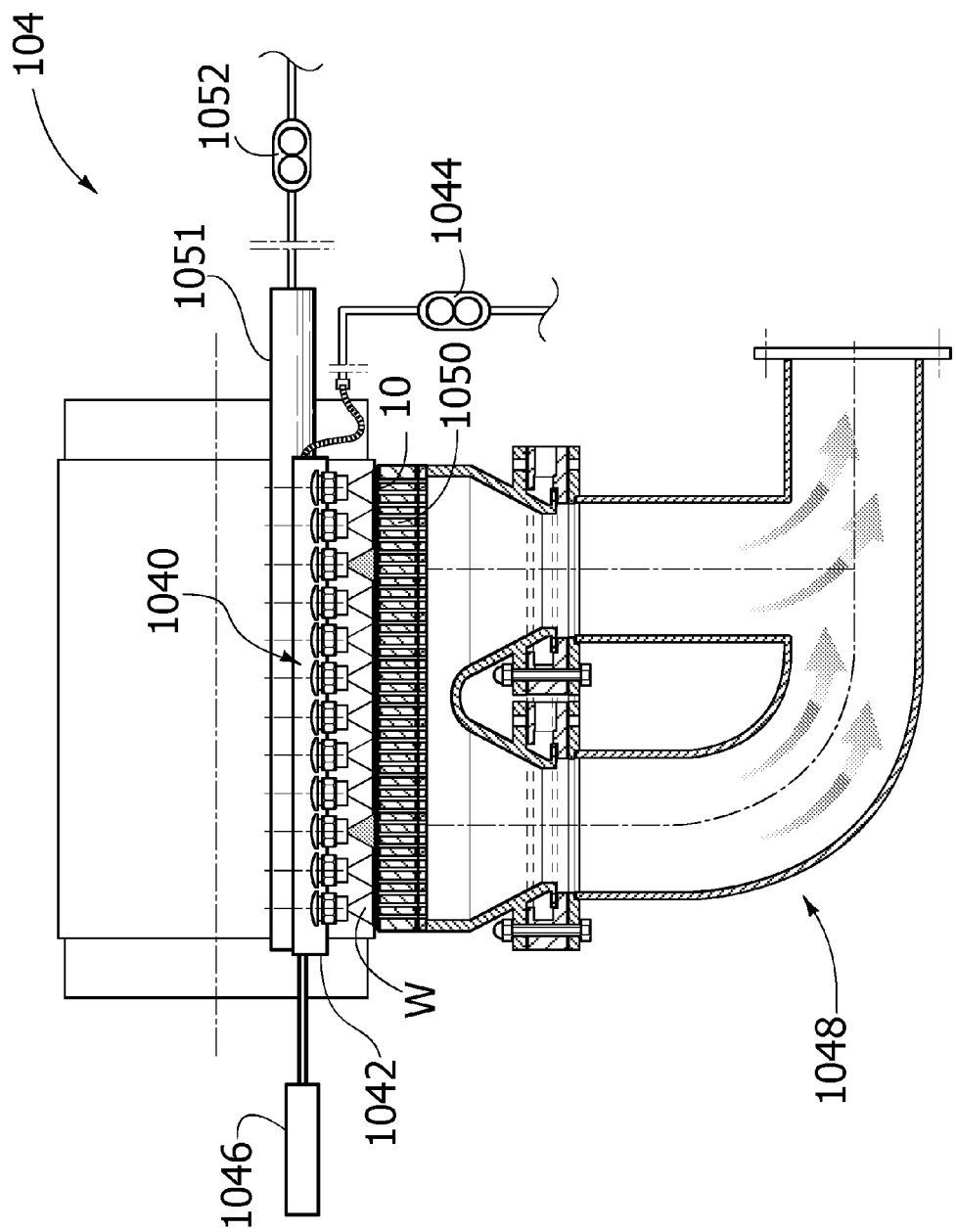
Figure 3:
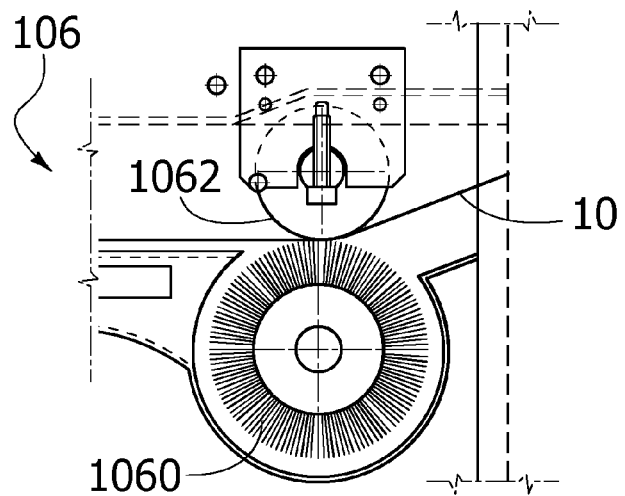
Figure 4:
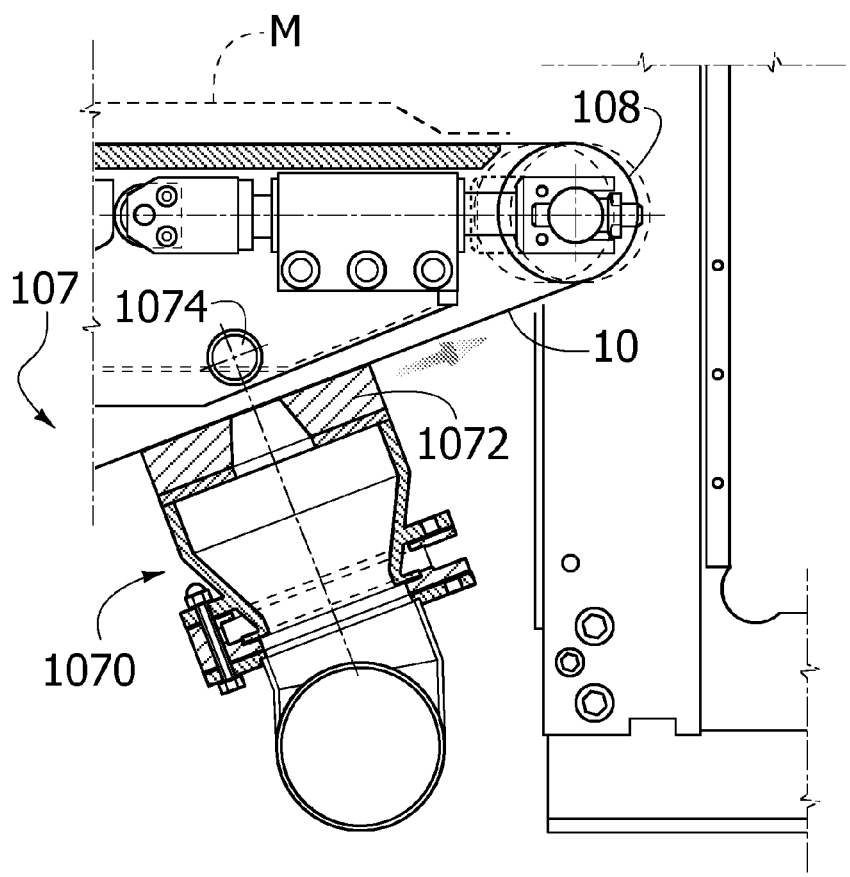

Now, the invention shall be described, strictly for exemplifying and non-limiting purposes, with reference to the attached representations, wherein:

FIG. 1 is a general side view of a laser treatment system incorporating the device described herein, FIG. 2 is a more detailed sectional view according to line II-II of FIG. 1, FIG. 3 substantially corresponds to a more detailed view according to arrow III of FIG. 1, and FIG. 4 substantially corresponds to a more detailed view according to arrow IV of FIG. 1.

DETAILED DESCRIPTION OF EMBODIMENTS

Illustrated in the following description are various specific details aimed at providing an in-depth understanding of the embodiments. The embodiments may be obtained without one or more specific details, or through other methods, components, materials etc. In other cases, known structures, materials or operations are not shown or described in detail to avoid obscuring the various aspects of the embodiments.

Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments.

References herein are only used for facilitating the reader and thus they do not define the scope of protection or the scope of the embodiments.

FIG. 1 is a general schematic view, substantially similar to a side elevational view, of a system for performing laser treatments (for example cutting and/or welding) obtained, for example, on material such as raw materials, components or articles in the sanitary articles industry.

The system in question includes a motorised conveyor 10 intended to support and move (from right to left, with reference to the perspective of FIG. 1) a material M subjected to the action of one or more laser treatment units 12. All this in a treatment zone or station indicated in its entirety with 101.

Exemplified characteristics of the treatment performed, the treatment unit/s 12 and, generally, the treatment zone 101, can be drawn from documents EP-A-1 447 068 and EP-A-1 736 272 previously mentioned in the introduction of the present description. Document WO-A-2008/081239 describes in detail exemplifying characteristics of the conveyor device 10, in particular regarding a conveyor having a mesh structure, thus not requiring repeating the respective description herein.

Regarding the description herein, it may be assumed that the conveyor 10 has a mesh structure and be intended, extending or moving following a closed loop trajectory, to move the material M through the treatment zone 101.

In the illustrated embodiment the above-mentioned closed loop trajectory leads the conveyor 10 to pass through, alongside the treatment zone 101, further zones or stations respectively indicated with references 102-107.

The conveyor 10 receives the material M upstream of the treatment zone 101 and the material M itself is then removed from the conveyor downstream of the treatment zone 101 itself.

Zone or station 102 is used for collecting possible treatment residues and for possible removal of faulty articles. Zone 103 is used for a first cleaning of the conveyor 10 and for removing any residues of the material M remaining on the conveyor 10. Zone 104 is used for washing using high-pressure water and zone 105 is used for a first drying of the conveyor 10. Zone 106 is used for a finishing brushing and zone 107 is used for the final drying of the conveyor. All the zones 102-107 are traversed by the conveyor 10 before it receives the material M once again to convey the material M itself through the treatment zone 101.

As already mentioned briefly beforehand, the zone 101 (whose characteristics are better observable from the documents mentioned in the introduction in the present detailed description of embodiments) corresponds to the zones in which the cutting and/or welding laser beam emitted by one or more sources 12 operates on the material M, supported and moved by the conveyor 10.

When using a mesh conveyor 10, the material M may be retained on the conveyor 10 by suctioning. Molten residues of material and/or process dusts may thus be entrapped in the mesh of the conveyor 10. Failure to suitably and continuously clean the conveyor, may in some application contexts lead to the openings of the mesh tending to be clogged hence causing the problem of contamination already mentioned in the introduction of the description.

For this reason, at the outlet of the treatment zone 101, after the material M has been removed (in any known manner), the conveyor 10 advances towards a zone 102 where the process wastes such as, for example, side scraps of the welded and/or cut articles in zone 101 are conveyed, for example, towards a suctioning structure from where such wastes, possibly after being ground, are conveyed (for example by means of conveying under suction) into collection separators.

A function for the removal of faulty articles may be provided for at zone 102 (according to known methods).

Zone 103 is a zone in which a rotary brush 1030 operates mainly. The brush serves the function of the first cleaning of the surface (for example a mesh surface) of the conveyor 10. The brush 1030 preferably rotates in a direction (anticlockwise, with reference to the perspective of FIG. 1) such to allow that the periphery of the brush 1030 which comes into contact with the conveyor 10 moves in the opposite direction with respect to the conveyor 10 itself.

The brush 1030 is controlled in rotation (by motor means not shown in the figures) at a very high speed, for example 1000 rpm, in such a manner to remove from the conveyor 10 coarse particles of molten material (or possibly entire pieces of material M) that may remain stuck on the conveyor 10. The removed residues/pieces are also conveyed towards a discharge structure (suctioning mouth 1032). In an embodiment, the mouth 1032 corresponds to the discharge structure which also provides for receiving the by-products (wastes, pieces, etc.) removed from the conveyor in zone 102.

In an embodiment, the brush 1030 may be a continuous cylindrical rotary brush. In an embodiment, the brush 1030 may have a structure similar to that of the rotary brush illustrated in WO-A-2008/081239.

Independently from its specific structure, in some embodiments the degree of interference between the brush 1030 and the conveyor 10 (for example a conveyor mesh) is adjusted to values included between 0.1 and 1 mm, such to guarantee an efficient brushing effect (hence cleaning) without subjecting the bristles of the brush 1030 to an early wear.

After the zone of first cleaning using the brush 103, the conveyor 10 advances to a zone in which the conveyor 10 is subjected to a high pressure washing operation followed by a drying treatment.

The sectional view of FIG. 2 illustrates the respective characteristics more in detail.

The system of washing using high pressure water is intended to operate in a continuous and/or discontinuous manner on the support surface of the conveyor 10.

In particular, the station 104 includes a series of nozzles 1040 supplied starting from a collector 1042 supplied with a high pressure liquid (e.g. water) supplied by a pump 1044.

Should the conveyor 10 have a mesh structure (or, generally, provided with openings), the high pressure washing jets W coming from the nozzles 1040 are projected from above towards the mesh of the conveyor 10 below so that the washing liquid passes through the openings of the mesh itself ensuring the mechanical removal of the molten residues deposited therein.

Preferred pressure values for the washing liquid (e.g. water) range between 100 to 500 bars.

In an embodiment, the nozzles 1040 are ordered in a linear series of nozzles arranged with a 20 mm pitch from each other for an extension such to ensure the cleaning action on the entire surface of the conveyor 10 susceptible to be exposed to contamination.

In an embodiment, the assembly of the washing nozzles 1040 (for example the collector structure 1042 that bears them) is subjected to the action of a movement member 1046 (for example a fluidic jack) which operates longitudinally on the collector 1042 in such a manner to impart an alternating to and fro movement in the direction transverse to the direction of advancement of the conveyor 10 to the assembly of the nozzles 1040. All this preferably occurs with a travel not lower (hence greater or at least equivalent) to the pitch of the nozzles 1040.

In an embodiment, the frequency of such alternating movement is included between 1 and 5 Hz, with a preferred value of 2 Hz. This to and fro movement allows the nozzles 1040 to be able to dynamically cover and wash the entire surface of the conveyor 10 which passes through the station 104 at a speed corresponding to the speed of advancement through the treatment zone, hence with values in the order of 10-500 meters/minute.

In an embodiment, the nozzles 1040 have a nozzle diameter ranging from 0.1-0.3 mm (with preferred value of 0.2 mm), and they are obtained on a stainless hard metal support and/or industrial sapphire stone.

The embodiment illustrated herein refers to a linear series of nozzles 10 hence including a single row or battery of nozzles 1040. In various embodiments one may add further rows of nozzles 1040, for example a second row of nozzles adjacent to the first row with the two lines of nozzles moving in a synchronous manner but in opposite direction in transverse direction with respect to the advancement direction of the conveyor according to the methods better described hereinafter.

The residue washing liquid which entrains the material removed therewith is suctioned and discharged by a vacuum mouth 1048.

In the illustrated embodiment, which refers to a conveyor 10 with a mesh structure, the mouth 1048 is located on the opposite side of the conveyor 10 with respect to the nozzles 1040.

The fact that the mouth 1048 operates in suctioning conditions (and not by simple dripping, though the use of this solution is not per se excluded from the scope of the present description) cooperates with the high pressure of the jets W allowing the washing liquid to pass through the conveyor 10, also avoiding leakage of water into the surrounding treatment zone.

The view of FIG. 2 highlights the fact that the mouth 1048 is closed at the mouth part thereof (bearing in mind that FIG. 2 is a sectional view) by a perforated plate 1050 defining a sliding surface (horizontal, in the illustrated embodiment) for the conveyor 10. The plate 1050 is made of a material which, on one side, ensures the sliding surface contact—bearing in mind that the mouth 1048 preferably operates under vacuum conditions—with the belt of the conveyor 10 being in movement, avoiding unwanted early wear thereof. For example, the material of the plate 1050 may be a so-called self-lubricating material such as polytetrafluoroethylene (teflon) or a ceramic material for industrial use (for example for making sliding supply bushings for yarns in textile machines).

In an embodiment, obtained in the plate or cover 1050 are openings (transverse slits, for example) which ensure that the water/air flow passes through at the battery of nozzles 1040 according to the methods described previously.

After the washing zone 104, the conveyor 10 advances through zone 105, which is a first drying zone.

In an embodiment, zone 105 includes one or more blowing units that impact the conveyor 10, at the outlet of the station 4 with compressed air jets, for example hot air (with typical values of 60°-150°) serving to dry the conveyor 10. In an embodiment, such blowing unit/s are simply made up of a metal pipe 1051 provided with a series of holes (for example 1 mm diameter holes) set facing towards the conveyor 10 in such a manner to project towards the conveyor itself compressed air, for example heated, supplied to the pipe 1051 itself by a generator 1052.

The number of such drying air outlet holes is usually greater than the number of washing nozzles 1040.

The pitch of the holes, the distance of the pipe (hence the air projection holes) from the conveyor 10, the operating pressure, the diameter and the geometry of the holes are selected in such a manner to ensure that the compressed air efficiently impacts the conveyor 10 ensuring drying thereof.

In the schematic representation of FIG. 1, the almost coinciding arrangement of zones 104 and 105 highlights the fact that, in an embodiment, the drying zone 105 is located immediately downstream of the washing zone 104. Hence, the mouth 1048 described previously with reference to the function of suctioning the washing liquid may also cooperate with the drying station 105. The element 1050 for covering the mouth 1048, actually shared by zone 104 and zone 105, is thus also capable of cooperating with the drying stations 105 for example also being provided with a series of openings (successive slits, as many as the blowing and drying lines) in such a manner to be able to convey also the wet residues removed in the drying zone 105 into the mouth 1048.

Once out of the drying zone 105, the conveyor 10 advances towards a zone 106 operating in which is a second finishing brush 1060 which preferably operates on the conveyor 10 in a cooperation relation with a rotary counter-roller 1062. In an embodiment, the brush 1060 is substantially analogous to the brush 1030 already described beforehand. This is substantially valid also regarding the adjustment parameters.

Also the brush 1060 is preferably rotated (anticlockwise with reference to the perspective of FIGS. 1 and 3) in such a manner that its periphery moves in direction opposite to the movement direction of the conveyor 10.

The brush 1060 serves to dynamically continuously remove possible residues (for example filamentous residues) still remaining on the conveyor 10 regardless of the previous cleaning operations carried out on the support 10 itself, for example due to temporary malfunctions (for example in case of temporary erroneous adjustment) of the cleaning stations located upstream.

The presence of the counter-roller 1062 (which, it shall be observed, moving with its periphery in the direction matching the advancement direction of the support 10 rotates in the same rotation direction as the brush 1060) serves to provide a contact surface for the conveyor 10 in such a manner that the same may be subjected to the action of the brush 1060 providing an appropriate contrast to the thrust action of the bristles of the brush 1060 itself.

In an embodiment, the section of the bristles (for example 0.2 mm) and the hardness of the same are selected in such a manner to ensure the penetration of the brush itself between the meshes of the conveyor 10 in such a manner to ensure a continuous and optimal cleaning action.

After zone 106 where the brush 1060 operates, the conveyor 10 lastly advances, before receiving the material M once again and returning towards the treatment zone 101, through a final drying zone 107 where the conveyor 10 is once again further dried by means of a further heated compressed air drying unit substantially similar to the station 105 described beforehand.

In an embodiment, zone 107 is located immediately upstream of the zone where the material M is to be treated and brought to contact with the conveyor 10 in such a manner to eliminate moisture possibly left on the conveyor 10 and susceptible to be transferred to the material M in the desired manner.

This fact is highlighted by the view of FIG. 4, which shows the drying zone essentially including a mouth 1070 possibly provided with a sliding grid 1072 for the conveyor 10 similar to element 1050 (previously described with reference to zone 105). The mouth 1070 operates under vacuum and receives drying air, preferably heated, coming from a pressurised air supply pipe 1074.

The zone or station 107 is located immediately upstream of the end idler roller 108 intended to return the conveyor 10—which in the meanwhile has once again received the material M—towards the treatment station 101.

In an embodiment, the final drying function assigned to the station 107 may be performed by a battery of lamps (for example UV lamps) intended to impact the band width of the conveyor 10 with the radiation emitted by the lamps in question.

Obviously, without prejudice to the principle of the invention, the details and embodiments may vary, even significantly, with respect to what has been described herein by way of non-limiting example only, without departing from the scope of the invention as defined by the attached claims.

The invention claimed is:

1. A device for conveying a material through a treatment station where the material is subjected to a laser treatment capable of leaving contamination residues on the device, the device comprising:
   a conveyor including a structure having a first surface for conveying the material and a second opposing surface, the conveyor being configured to follow a closed loop trajectory wherein the material is received on the first surface upstream of the treatment station and removed downstream of the treatment station, the structure having openings extending from the first surface to the second surface;

a first brushing station positioned to brush the first surface of the conveyor after the material has been removed;

a washing station including nozzles positioned adjacent the second surface of the structure and configured to project a washing liquid through the openings in the structure from the second surface to the first surface after the surface has passed through the first brushing station and a suctioning structure positioned adjacent the first surface of the conveyor for removing the washing liquid from the conveyor, the suctioning structure having an open mouth portion configured to support the conveyor;

a first drying station including at least one blowing element configured for directing a flow of drying aeriform substance at the first surface after the first surface has passed through the washing station, the suctioning structure of the washing station being sized and positioned such that residues and/or washing liquid removed in the drying station by the flow of drying aeriform substance is directed into the open mouth portion of the suctioning structure; and a second brushing station positioned to brush the first surface of the conveyor after the surface has passed through the washing station, the washing station being positioned intermediate the first and second brushing stations.

2. A device according to claim 1 wherein the suctioning structure of the washing station includes a perforated plate closing the open mouth portion, the perforated plate defining a sliding surface configured to support the conveyor.

3. A device according to claim 1 further comprising a second drying station including at least one blowing element configured for directing a flow of drying aeriform substance at the first surface.

4. A device according to claim 3 wherein the second drying station comprises a suctioning structure configured for suctioning the drying aeriform.

5. A device according to claim 1 further comprising motor means configured to impart to the nozzles a transverse scanning movement with respect to the conveyor.

6. A device according to claim 5 wherein the motor means is configured to impart to the nozzles an alternating type of transverse scanning movement with respect to the conveyor, the alternating scanning movement having a frequency of between 1 and 5 Hz.

7. A device according to claim 1 wherein the washing station is configured such that the washing liquid is projected towards the conveyor with a pressure of between 100 and 500 bars.

8. A device according to claim 1 wherein the washing station is configured to project a heated washing liquid.

9. A device according to claim 2 wherein the perforated plate comprises low friction and/or low wear sliding material.

10. A device according to claim 1 wherein the drying aeriform substance is heated to a temperature between 60 and 150° C.

11. A device according to claim 1 wherein the first and second brushing stations each include respective rotary brushes configured to rotate in a direction that results in brushing of the conveyor in a direction opposite to an advancement direction of the conveyor.

12. A device according to claim 1 further including at least one of:
- a separation station located upstream of the first brushing station, the separation station configured to remove from the conveyor treatment residues of the material and/or possible fractions of residual material on the conveyor after removing the material itself from the conveyor; and
- a second drying station located downstream of the second brushing station.

* * * * *